United States Patent [19]

Melchior et al.

[11] Patent Number: 4,596,237
[45] Date of Patent: Jun. 24, 1986

[54] SOLAR-ENERGY CONVERTER

[75] Inventors: Bernd Melchior, Remscheid; Friedrich W. Grimme, Aachen; Wolfgang Heidrich, Nörvenich, all of Fed. Rep. of Germany

[73] Assignees: BM Chemie Kunststoff GmbH, Wermetskirchen; Kernforschungsanlage Julich GmbH, Julich, both of Fed. Rep. of Germany

[21] Appl. No.: 589,347

[22] Filed: Mar. 14, 1984

[30] Foreign Application Priority Data

Mar. 14, 1983 [DE] Fed. Rep. of Germany ....... 3309032

[51] Int. Cl.$^4$ ................................................ F24J 3/02
[52] U.S. Cl. ................................... 126/430; 126/431; 126/400; 126/901; 126/429; 52/306; 165/47
[58] Field of Search ............... 126/400, 419, 428, 429, 126/430, 431, 436, 901; 165/10, 47 HS, DIG. 4; 52/173 R, 171, 306–308

[56] References Cited

U.S. PATENT DOCUMENTS

| 4,178,727 | 12/1979 | Prusinski et al. | 52/173 R |
| 4,207,865 | 6/1980 | Allen | 126/431 |
| 4,250,871 | 2/1981 | Milburn | 126/430 |
| 4,290,416 | 9/1981 | Maloney | 126/430 |
| 4,356,815 | 11/1982 | Spanoudis | 126/449 X |
| 4,446,851 | 5/1984 | Grose | 126/449 |
| 4,498,459 | 2/1985 | Korin et al. | 126/430 |

FOREIGN PATENT DOCUMENTS

| 0005009 | 10/1979 | European Pat. Off. | 126/430 |
| 0028800 | 5/1981 | European Pat. Off. | |
| 2933952 | 3/1981 | Fed. Rep. of Germany | 126/431 |
| 0613764 | 10/1979 | Sweden | 126/431 |

Primary Examiner—Margaret A. Focarino
Attorney, Agent, or Firm—Karl F. Ross; Herbert Dubno

[57] ABSTRACT

A solar energy converter which can be used as a solar collector or for the direct mounting on a building for the heating of the interior thereof through a wall of the building has a light transmissive layer spaced from this wall and provided on its inner side with an absorptive surface at which incident solar energy is transformed into heat. One or more solar structures between this layer and the wall contain a chemico-physical phase transformation medium capable of storing latent heat when thermal energy is produced at the absorptive surface and adapted to release this heat through the wall or to a heat carrier fluid which can be passed through a space formed by the solar structure.

15 Claims, 5 Drawing Figures

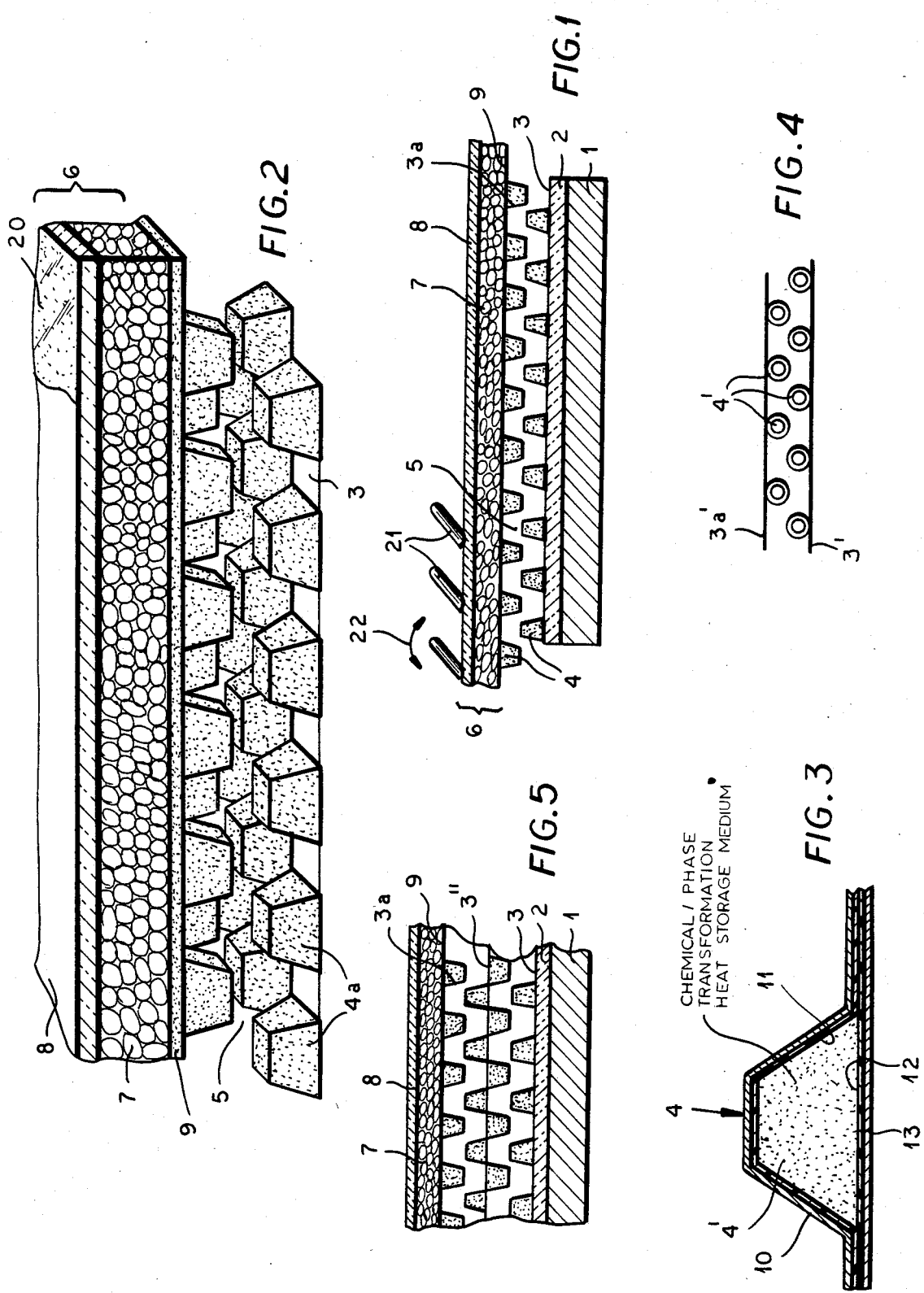

SOLAR-ENERGY CONVERTER

FIELD OF THE INVENTION

Our present invention relates to a solar-energy converter and, more particularly, to an apparatus for transforming incident solar energy to thermal energy which can, in turn, be transferred to a structure, e.g. direct or indirect through a wall of this structure or in a solar-collector mode of operation in which a heat carrier serves to transfer the thermal energy from its collection zone to a zone of use. The invention, therefore, relates to a solar collector or a portion of a wall which serves as a solar collector and can form an external wall of a building, e.g. a facade thereof.

BACKGROUND OF THE INVENTION

It is known to provide solar collectors and even passive solar heating structures in which a surface permeable to solar energy is provided parallel to an absorber of such energy, the solar rays passing through the surface and being transformed at the absorber into usable heat.

In a conventional solar collector utilized for active solar heating, the absorber generally forms a wall of a passage through which a heat-carrying fluid can be circulated.

In passive solar heaters which form a wall of a structure the absorber may be in heat exchanging relationship with a wall through which thermal energy is transmitted to the interior of the building.

In both cases, therefore, a wall parallel to the surface permeable to solar radiation forms part of the structure or is mounted thereon and the absorption layer along a surface of the permeable layer serves for absorption of the solar radiation energy. Thus, the outer wall of the building can be formed directly by the layer permeable to the solar radiation and the system can be such that it not only transforms the solar energy into heat but also stores the heat. Walls of this type are, of course, expensive because of the relatively large masses required for energy storage and cannot avoid high thermal losses by reradiation, conduction or the like.

OBJECTS OF THE INVENTION

It is the principal object of this invention to provide a solar collector or facade, i.e. a solar converter, which in spite of a simple construction has low thermal losses and can be utilized for the storage of comparatively large amounts of heat while being of light weight and low mass.

Another object of this invention is to provide an improved solar converter which can be used effectively in an active solar collector or as a passive device for the transformation of solar energy to thermal energy for use in regulating the temperature of a building on which the solar converter is mounted.

SUMMARY OF THE INVENTION

These objects and others which will become apparent hereinafter are attained, in accordance with the present invention, which provides a solar converter, e.g. a solar collector or a portion of a building, e.g. its facade, having an outer light-permeable layer or suface which is permeable to the solar radiation, an inner wall which can be spaced from this outer surface, at least one absorber layer between the outer surface and the inner wall, the absorber layer defining a space which at least in part contains a chemicophysical phase-transformation medium undergoing at least in part by chemical reaction or physical phase transformation a change of state upon heating and in which the change of state is reversible to release the heat upon cooling, the medium being a salt-hydrate, a mixture of salt-hydrate and salt, or reciprocal salt pairs.

Such substances by chemical reaction on heating and/or partial solubilization or melting can undergo phase transformation from the solid phase to the liquid phase and hence can obstruct latent heat of such transformation to release the latent heat of transformation upon phase transformation reversal.

The term "wall" as used herein generally can refer to a vertical or facade structure of a building but is also intended to include an inclined or horizontal outer surface of a building, e.g. a roof therein. The "wall" can also form a part of an active solar collector, i.e. a unit through which a heat carrier is circulated.

In the construction of the invention, the heat generated at the absorption layer is directly transformed to the salt hydrate or other phase transformation medium so that rapid and loss-free storage of heat is assured with a simple, stable and economical structure. Therefore, a high energy recovery can be ensured. The solar converters of the invention can be easily mounted and operated with low capital and operating cost and especially can be utilized as outer walls or portions of outer walls of a building to serve both as solar collectors and as insulating members. If the system of the invention is applied to an outer wall, especially a masonry outer wall or an outer wall which has a high thermal capacity, it can act not only as a latent store of heat but also as a mass storage of heat.

Contamination and condensation problems do not arise and pumps or blowers need only be used when a rapid heat recovery is required from the converter or it is necessary to transport the heat from the converter to distant portions of the building.

The outer surface of the wall of the invention can be designed to architecturally and aesthetically suit the building exterior.

Energy stored in the medium-filled spaces of the device can directly be radiated into the exterior of the building or can be transformed indirectly thereto via another wall lying between this space and the space to be heated. Alternatively, the space containing the latent heat storage medium can be traversed by a fluid, e.g. air so that this air can act as a heat carrier and can have the latent thermal energy transformed directly to it.

It has been found to be especially advantageous when between the outermost light-transmissible layer and the absorption surface, a light permeable foam, silica gel or a layer of capillary tubes perpendicular to the wall is provided. This latter layer permits the passage of solar radiation but serves as an insulation layer preventing the escape of thermal energy from the collector to the interior.

Naturally the outermost transport layer can also be composed of such a foam, silica gel or capillary tubes instead of or in addition to the intermediate insulating layer.

It has been found to be advantageous to allow the medium-filled space to penetrate at least partially into the light permeable layer. This ensures not only a reduced thickness of the assembly but also an optimum capture of the solar radiation energy. A simple and rapid transport of the heat can be effected when the carrier fluid is displaced through a space or compartment between the absorption surface and the light permeable layer and/or between the absorption surface and the inner wall or innermost surface of the collector.

It has been found to be advantageous to form one or both side walls defining a space which can be traversed by a heat carrier fluid from a foil plate, sheet or layer of synthetic resin or metal which can be formed unitarily with the medium-filled space and which can project into the compartment through which the carrier fluid is circulated in the foam and cells which can have discrete construction or can be constituted as ribs, corrugations, box-like formations, rectangular or cubical projections, cones, cylinders, spheres, pyramids or frustums thereof or truncated geometrical shapes of any desired configuration. Any of these projecting formations can be referred to as a cell in accordance with the principles of the invention. The medium-filled space is hereinafter referred to as a cell or as a collection of cells, and any of these configurations will be understood as being included in the term "cell".

Preferably the cells are discrete, i.e. are individual projections which do not communicate with one another and which enclose alternatively small volumes selected such that there is no tendency within each cell for the salt crystals and the melt thereof, i.e. the solid and liquid phases to separate.

A foil, plate or layer can be affixed directly to the outer face of the inner wall and between this foil, plate or layer and the inner wall, a layer of thermal insulation can be provided when a carrier fluid is utilized to thereby ensure that the heat transfer will be effected practically completely to the heat transfer fluid.

It has also been found to be advantageous and is another feature of the invention, that such a foil, plate or layer be formed by or indirectly on the absorption surface or the inner face of the light-permeable layer. Especially effective results have been obtained when the transparent layer is composed in whole or in part of an acrylic synthetic resin such as Plexiglass or of silica gel.

When, because of the economics and convenience of manufacture, the cells are formed by drawing or other shaping of a plate, foil or disc of metal or synthetic resin, the open side of these cells can be closed by a second plate, foil or disc. Especially effective results are obtained when the foils are composed of aluminum and are coated at least in part where they come together with a synthetic resin material which can be thermally or ultrasonically welded together.

BRIEF DESCRIPTION OF THE DRAWING

The above and other objects, features and advantages of the present invention will become more readily apparent from the following description, reference being made to the accompanying drawing in which:

FIG. 1 is a section through a portion of a solar converter according to the present invention shown in a highly diagrammatic form;

FIG. 2 is a section of another embodiment illustrated with a slight perspective and also in highly diagrammatic form;

FIG. 3 is a section through one cell of the type which can be used in the embodiment of FIGS. 1 and 2;

FIG. 4 is a section through a portion of a solar converter illustrating another cell construction; and FIG. 5 is a view similar to FIG. 1 but illustrating another embodiment of the invention.

SPECIFIC DESCRIPTION

The embodiment shown in FIG. 1 includes a wall 1 which can be composed of masonry or concrete and is the outer wall of a building. This wall is provided with a thermally insulating layer 2, e.g. of a polyurethane or polyethylene foam or of a pressed-fiber material and on this thermal insulation layer is applied a cellular structure 3 of aluminum foil or synthetic resin which is deep drawn to form cells 4 which are filled with the phase transformation medium as will be described in greater detail in connection with FIG. 3.

These cells have a frustopyramidal configuration.

The cells or projections 4 converge toward an assembly of cells or projections on another foil structure 3a of a similar construction which is applied to the inner surface of an absorption layer 9. The cells 4 of the structure 3a converge toward the cells 4 of the structure 3 and a space 5 is provided between these structures and includes the cells so that a fluid, i.e. a heat carrier fluid such as air, can be forced by a blower (not shown) through this space to pick up heat from the solid.

The cells 4 are filled with a salt hydrate, e.g. Glauber's salt or sodium sulfate hydrate, or with a mixture of this salt hydrate and a salt, e.g. sodium sulfate, or with reciprocal salt pairs which undergo a foil transformation and/or chemical reaction upon heating to store the thermal energy. The volume of each cell is sufficiently small so that in these cells salt cyrstals and melt do not tend to separate. This effect of preventing separation of the melt from the solid face can be ensured when individual cells are provided as has been shown but also can be obtained when the cells are tubules as has been illustrated for the tubules 4' shown in cross section on the two foil structures 3a and 3' in FIG. 4. One such assembly as shown in FIG. 4 can be utilized in the system of FIG. 1 in place of the cell structures 3 and 3a there shown or, in addition to these structures, between the structure 3 and the insulation 2, for example, when a plurality of such assemblies is preferred with a plurality of spaces 5 in comparatively high density.

Indeed, in FIG. 5 we have shown an additional layer 3" of cells between the cells of the structures 3 and 3a in an assembly otherwise similar to that of FIG. 1. In place of air as the heat carrier fluid, water can also be used.

As illustrated in FIG. 3, moreover, each cell 4 can be seen to contain the medium 4' and to be defined by permeable deep-drawn pockets in an aluminum foil layer 10 which is lined at 11 with a synthetic resin such as polyethylene which can be thermally fused to the polyethylene layer 12 of a cover foil 13 which closes the pockets.

As can be seen from FIGS. 1 and 5, moreover, the filled cells and the projections extend into a space 5 which is externally closed by an outer light-permeable layer 6, the inner surface of which forms an absorption layer or surface 9 to which the structure 3a is bonded.

The free ends of the projections 4 and 4a which extend in opposite directions can lie in a common plane so that an optimum flow of the fluid through the space 5 is ensured together with optimum heat transfer thereto.

The outer transparent layer 6 includes a transparent insulating layer 7 of a foam (e.g. an acrylic or other synthetic resin or even a glass foam), silicate gel (e.g. aerogel or another amorphous silicon oxide) or a structure formed by capillary tubules. The layer 7 is externally protected by a thin layer, plate, foil or lacquer 8 of a light permable synthetic resin, especially an acrylic.

This layer not only protects the layer 7 but facilitates cleaning and can provide an aesthetic appearance to the assembly so that it is architecturally compatible with the structure. The layer 8 thus can have an architectural configuration and can be composed of individual plates, strips and blocks separated by grooves or gaps to generate the appearance of an imbricated or masonry structure.

These elements can be provided with projections or pins which can extend into or be bonded to the structure 3a and the outer face of this structure can be provided with a black coloration so that it constitutes the absorptive layer or forms an additional absorptive layer to assist in the transformation of the solar radiation to heat. The dark coloration can be a selective layer applied to all or only a portion of the surface and can be designed to allow the significant part of the solar spectrum to be insulated and to prevent substantially any radiation above about 2 microns from being lost. Between the structure 3a and the foam layer 7 additional compartments or channels can be provided through which a fluid, especially water or air, can be passed to carry off heat.

The flow of the fluids can be effected by convection or through the use of a pump or blower.

As can be seen from the embodiment of FIG. 2 which differs from that of FIG. 1, substantially only in that on the backside of the structure 3 no heat barrier 2 is provided, the solar energy zone over the day is radiated directly into the space to be heated. In this case, any heat carrier fluid may be provided in addition or no heat carrier fluid need be provided since the thermal energy is recovered in the interior of the building by direct heat transfer.

Consequently, during daylight hours solar energy tranversing the layers 7 and 8 is transformed into heat at the absorption surface 9 and causes the salt hydrate in the cells 4 to melt or the reciprocal salt path to be chemically interchanged, the latent heat of these reactions being thereby absorbed in the chemical-physical transformation. During the evening and night, the chemical-physical transformation medium reverses in a function to release the heat which is given off into the interior of the building and cannot escape from the solar converter by reason of the thermal barrier constituted by the layer 7.

In Southern regions where summer days can result in excess infrared penetration into the collector, the outer layer 6 can be provided, as has been shown at 20, with a vapor-deposited infrared reflective layer. Alternatively or in addition, jalousie-type louvers can be provided as shown at 21 for swinging movement (arrow 22) to control the penetration of solar energy into the unit.

The wall on which the unit of the invention is applied can be inclined or horizontal and can be, for example, a roof. Alternatively, the unit can be provided free-standing upon the structure or can form part of or can constitute a solar collector thereof.

An advantage of the latent heat storage of the invention resides in the fact that the heat is stored and released by a phase transformation of crystalline salts to solubilized or molten salts and thus substantial amounts of energy can be stored by comparison with the more passive storage resulting from heat capacity of a material which does not undergo a phase transformation.

The phase transformation for any given composition occurs at a predetermined temperature and indeed the invention allows selection of the temperature of the phase transformation by adjustment of the salt type and composition. The heat take-up and release temperatures can be adjusted, therefore, to be 14°, 15°, 16°, 18° or 20° C. as may be desired. This means that even when considerable solar energy is incident upon the device during the phase transformation, the absorption wall is at a substantially constant temperature, namely, that at which the phase transformation of the salt occurs. Only when the latent storage is fully saturated, i.e. the phase transformation capacity is exceeded, is there an increase in the temperature of the latent heat storage medium. Furthermore, during heat evolution of the latent heat storage medium, the heat is absorbed at a constant temperature and thus the medium acts as a thermal buffer which levels the temperature or equalizes the temperature between the temperatures at different times of the day.

In Southern regions where there is a sharp temperature differential between the daytime temperature and the nighttime temperature, overheating in the building is avoided in that the transformation of the latent heat storage medium can be set at about 20° C. As a consequence, when the temperature drops, there is no significant cooling since the latent heat store releases heat at a temperature of 20° C. The termination of release of the temperature is only a function of failure of the capacity of the phase formation medium and this capacity can be large because the low cost of the unit enables large wall surfaces of the building to be formed thereby. In the case that large storage capacities are provided, failure to release sufficient thermal energy is only a result of failure of sufficient incident energy to be received. The air circulator coupled with a chamber or compartment 5 need not operate continuously and can be utilized discontinuously and the air can be distributed throughout the building for space heating purposes. Wherever the air flows, the latent storage medium can be provided so that this medium need not be disposed only at the facade. In other words, air can carry heat from the facade collector to internal regions of the building or elsewhere and along the way can carry the heated air into contact with structures of the latent storage medium which will thereupon take up and later give off heat to the circulated air. The entire building can thus function as a thermal buffer and storage unit.

We claim:

1. A solar converter comprising:
    a building wall having an outer surface;
    a layer transmissive to solar radiation spaced from said outer surface of said wall and provided with an outer translucent surface, a body of light-transmissive but heat-insulating material inwardly of said outer transparent surface layer, an energy-absorbing surface inwardly of said body of light-transmissive but heat-insulating material and converting incident solar energy to heat;
    at least one structure in heat-exchanging contact with said energy-absorbing surface and containing a chemico-physical latent heat storage medium, said medium being selected from the group which consists of at least one salt hydrate, reciprocal salt pairs or a mixture of a salt hydrate and a salt; and
    means defining a space between said energy-absorbing surface and said outer surface of said wall for receiving a fluid in contact with said structure, said space forming a barrier to solid-conduction of thermal energy between said energy-absorbing surface and said outer surface of said wall.

2. The solar converter defined in claim 1 wherein said body is composed of light-permeable foam, silica gel or capillary tubules.

3. The solar converter defined in claim 1 wherein said outer translucent surface formed by a light-permeable foam, silica gel or capillary tubules.

4. The solar converter defined in claim 1 wherein said space penetrates at least in part into said layer.

5. The solar converter defined in claim 1 wherein said structure comprises individual cells projecting into said space, and said space is traversed by a heat carrier fluid.

6. The solar converter defined in claim 5 wherein said cells are formed in a sheet provided with deep-drawn projections constituting said cells, said cells being separate from one another and being filled with said heat-storage medium.

7. The solar converter defined in claim 6 wherein said sheet is affixed to said energy-absorbing surface.

8. The solar converter defined in claim 6 wherein said body is formed at least in part of an acrylic synthetic resin.

9. The solar converter defined in claim 6 wherein the cells of said sheet are closed by another sheet welded to the first mentioned sheet.

10. The solar converter defined in claim 9 wherein each of said sheets is composed of aluminum covered with a synthetic resin along surfaces of said sheets which are welded together.

11. The solar converter defined in claim 1, further comprising means on said outer translucent surface of said layer for selectively protecting it against detrimental incursion.

12. The solar converter defind in claim 6 wherein a plurality of such structures in stacked relationship with intervening compartments, traversed by a fluid are disposed between said layer and said wall.

13. The solar converter defined in claim 6 wherein said energy-absorbing surface is a selective layer.

14. The solar converter defined in claim 11 wherein said means on said outer face is a jalousie assembly of louvers.

15. The solar converter defined in claim 11 wherein said means on said outer face is a vapor deposited reflective layer selectively blocking infra red.

* * * * *